US006340544B1

(12) United States Patent
Akutsu et al.

(10) Patent No.: US 6,340,544 B1
(45) Date of Patent: Jan. 22, 2002

(54) PROCESS FOR RECORDING IMAGE USING PHOTOELECTRODEPOSITION METHOD AND PROCESS FOR PRODUCING COLOR FILTER USING THE SAME

(75) Inventors: Eiichi Akutsu; Shigemi Ohtsu; Lyong Sun Pu, all of Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/317,997

(22) Filed: May 25, 1999

Related U.S. Application Data

(63) Continuation-in-part of application No. 08/929,673, filed on Sep. 15, 1997, now Pat. No. 6,066,420.

(30) Foreign Application Priority Data

Sep. 19, 1996 (JP) ............................................ 8-248228
Jun. 10, 1998 (JP) .......................................... 10-162170

(51) Int. Cl.[7] ........................... G02B 5/20; G03G 5/024
(52) U.S. Cl. .............................. 430/7; 430/31; 205/91; 205/92; 205/124; 205/157
(58) Field of Search ......................... 430/7, 31; 205/91, 205/92, 124, 157

(56) References Cited

U.S. PATENT DOCUMENTS 6,066,420 A * 5/2000 Ohtsu et al. .................. 430/31

FOREIGN PATENT DOCUMENTS

| | | | |
|---|---|---|---|
| JP | 4-9902 | | 1/1992 |
| JP | 4-104101 | * | 7/1992 |
| JP | A-5-60914 | | 3/1993 |
| JP | A-5-119209 | | 5/1993 |
| JP | A-5-157905 | | 6/1993 |
| JP | A-6-293125 | | 10/1994 |
| JP | A-10-97125 | | 4/1998 |

OTHER PUBLICATIONS

English Abstract of JP 10–097125, Otsu et al., Apr. 1998.*
Yoneyama, H. et. A1, "Photoeletrochromic Properties of Polypyrrole–Coated Silicon Electrodes," J. Electrochem. Soc.: Electrochemical Science and Technology, Oct. 1985, vol. 132, No. 10, pp. 2414–2417.
Hamasaki, Y. et al., "Photoelectrochemical Properties of Anatase and Rutile Films Prepared by the Sol–Gel Method," J. Electrochem. Soc., vol. 141, No. 3, Mar. 1994, pp. 660–663.
Fujishima, Akira et al., "Electrochemical Photolysis of Water at a Semiconductor Electrode," Nature, vol. 238, Jul. 1972, pp. 37–38.

* cited by examiner

*Primary Examiner*—John A. McPherson
(74) *Attorney, Agent, or Firm*—Oliff & Berridge PLC

(57) ABSTRACT

To provide a process for recording an image using a photoelectrodeposition method having high general-purpose properties that require no restriction on the selection of a material used as a substrate, a process for recording an image having (A) arranging a substrate 10 comprising a support 11, a conductive film 12 and a photosemiconductor thin film 13 laminated in this order, in such a manner that at least the photosemiconductor thin film 13 comes in contact with an electrodeposition solution 20; (B) applying an electric current or a voltage to the conductive film 12, and simultaneously irradiating the substrate 10 with light from the side of the photosemiconductor thin film 13 through the electrodeposition solution 20, and (C) generating a photoelectromotive force on a light irradiated part, so as to form an electrodeposition film 21 on the light irradiated part. The process for recording an image further comprises, if desired, (D) transferring the electrodeposition film 21 onto an image retaining substrate 40, such as ordinary paper.

18 Claims, 6 Drawing Sheets

PROCESS FOR RECORDING IMAGE USING PHOTOELECTRODEPOSITION METHOD AND PROCESS FOR PRODUCING COLOR FILTER USING THE SAME

This application is a continuation-in-part of application Ser. No. 08/929,673 (now U.S. Pat. No. 6,066,420), filed Sep. 15, 1997.

FIELD OF THE INVENTION

The present invent ion relates to a process f or recording an image that can be widely applied to a multi-color printer for office use and industrial production of a color filter. More particularly, it relates to a process for recording an image using a photoelectrodeposition method capable of easily forming an image having high colorfulness and high resolution.

BACKGROUND OF THE INVENTION

In recent years, techniques using an electrodeposition method have been proposed as a process for forming an image that can form a minute image pattern, and have been utilized for printing and producing a color filter. For example, JP-A-6-293125 proposes an offset printing method using an electrodeposition method. JP-A-4-9902 proposes a technique relating to a process for forming a minute pattern utilizing an electrodeposition method. Furthermore, JP-A-5-60914 proposes a technique relating to a process for producing a color filter using an image forming method utilizing an electrodeposition method. However, these methods require that a conductive film on an electrodeposition substrate be previously subjected to patterning by photolithography, which results in a high production cost.

A method containing no photolithography process includes processes for producing a color filter disclosed in JP-A-5-15-157905 and JP-A-5-119209. In these processes for producing a color filter, the conductivity of a light-irradiated part is increased by irradiating with light with utilizing photo-memory properties of a photosemiconductor, and an electrodeposition material is deposited only on the light-irradiated part by utilizing a redox reaction of the elect rodeposition material. This method requires application of a voltage of about 60 V, and it is difficult to control the variations in the thickness of the electrodeposition film. Furthermore, the hysteresis due to the irradiation of light remains on the substrate, which results in low reproducibility.

The present inventors have proposed a process for recording an image utilizing a photoelectromotive force of a photosemiconductor in JP-A-10-97125. According to a method, an electrodeposition material can be deposited by application of a voltage of 5 V or lower, control of the thickness of the electrodeposition film is easily conducted, and a minute image pattern can be formed with good reproducibility. Furthermore, according to a method, because an electrodeposition film formed on a substrate can be transferred as it is to recording paper, no printing plate is necessary, and the method can be preferably applied to a printing machine for office use aiming image recording in small quantity with large variation.

However, in the process for recording an image, because the irradiation of light is conducted from the back surface of a substrate, a material having transparency to the irradiation light must be used as a material of a substrate, a conductive film and a photosemiconductor thin film, and there has been limitation on selection of materials and selection of light sources for irradiation. Furthermore, when the process is applied to a printing machine, there is great restriction on design of the machine because the irradiation of light is conducted from the back surface of the substrate.

SUMMARY OF THE INVENTION

An object of the invention is to provide a process for recording an image using a photoelectrodeposition method having high general-purpose property that requires no restriction on the selection of a material used as a substrate.

Another object of the invention is to provide a process for recording an image that can form an image having high resolution and high gradation.

A further object of the invention is to provide a process for producing a color filter of high resolution having a high smoothness and a high light transmissibility.

In order to solve the problems described above, the process for recording an image according to the invention comprises a step of arranging a substrate comprising a support, a conductive film and a photosemiconductor thin film laminated in this order, in such a manner that at least the photosemiconductor thin film comes in contact with an electrodeposition solution; and a step of applying an electric current or a voltage to the conductive film, and simultaneously irradiating the substrate with light from the side of the photosemiconductor thin film through the electrodeposition solution, to generate a photoelectromotive force on a light irradiated part of the photosemiconductor thin film, so as to form an electrodeposition film on the light irradiated part.

When the photosemiconductor thin film is irradiated with light, a photoelectromotive force is generated on the light irradiated part of the photosemiconductor thin film. The photoelectromotive force is added to the bias caused by the electric current or the voltage applied to the conductive film, and when the electric potential of the photosemiconductor thin film exceeds the threshold value required for electrodeposition of the electrodeposition material, an electrodeposition film is formed only on the light irradiated part.

In the invention, because the irradiation of light is conducted from the side of the photosemiconductor thin film through thee electrodeposition solution, it is not necessary that the support and the conductive film which constitute the substrate are transparent to the irradiated light. Therefore, the range of selection of the light source used for irradiation of light and the materials used in the substrate are widened. Furthermore, because the irradiation of light is conducted from the side of the photosemiconductor thin film, the restriction on design of printing machines is also dispelled.

By using an ionic molecule, whose solubility changes corresponding to the change of the pH, as the electrodeposition material used in the invention, the electric current or the voltage applied to the conductive film can be set small. As a result, the thickness of the electrodeposition film can be controlled with high precision, and thus an image having a high smoothness can be formed with good reproducibility.

Furthermore, by repeating the process described above by using various kinds of electrodeposition solutions, a multi-color image can be formed on a substrate. When a red electrodeposition film, a green electrodeposition film and a blue electrodeposition film are formed according to the process for forming an image of the invention, and then a black electrodeposition film is formed on the part on which the electrodeposition films are not formed, a color filter containing a black matrix can be easily produced without using photolithography.

Furthermore, because the electrodeposition film formed on the substrate can be easily transferred to various image retaining substrates, the process for recording an image can be widely applied to various fields, such as a printing process of ordinary paper and industrial production of a color filter.

DETAILED DESCRIPTION OF THE INVENTION

One embodiment of the process for recording an image of the invention will be described with reference to FIGS. 1A to 1E.

Figure 1A:
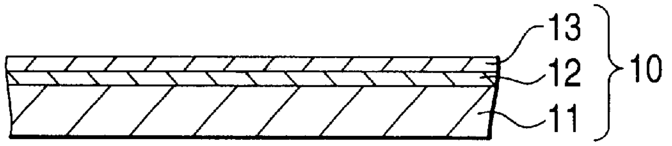
FIGS. 1A to 1E are schematic cross sectional views showing one embodiment of the process for recording an image according to the invention.
Figure 1B:
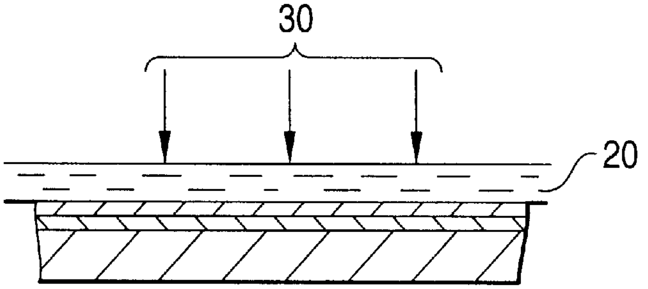
Figure 1C:
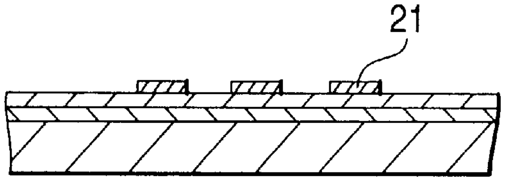
Figure 1D:
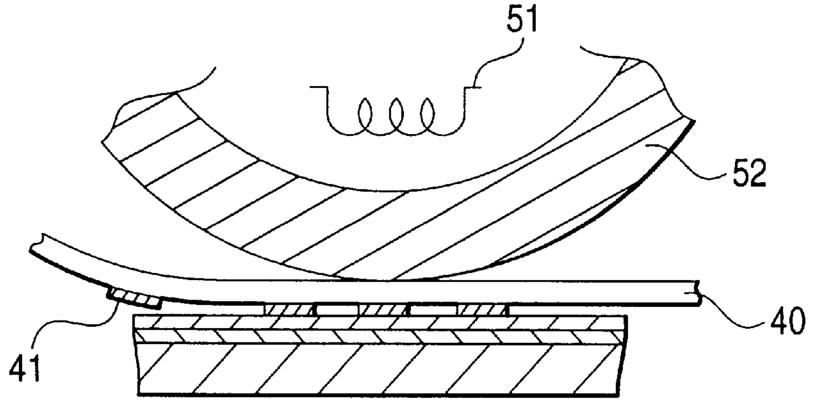
Figure 1E:
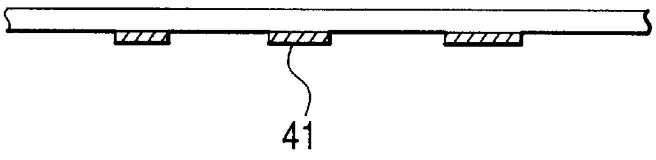

A substrate 10 comprising a support 11, a conductive film 12 and a photosemiconductor thin film 13 laminated in this order is arranged in such a manner that at least the photosemiconductor film 13 comes in contact with an electrodeposition solution 20 (FIG. 1A). With applying an electric current or a voltage to the conductive film 12, light 30 is imagewise irradiated to the substrate 10 from the side of the photosemiconductor thin film through the electrodeposition solution 20 (FIG. 1B). An photoelectromotive force is generated on the light irradiated part of the photosemiconductor thin film 13, which is added to a bias caused by applying the electric current or the voltage to the conductive film 12, and when the electric potential of the photosemiconductor thin film 13 exceeds the threshold value of electrodeposition of the electrodeposition solution, an electrodeposition film 21 is formed only on the light irradiated part (FIG. 1C). If desired, by bringing an image retaining substrate 40 into contact with the substrate 10 having the electrodeposition film 21 thereon, and heating the same with an elastic roller containing a heater 51 (FIG. 1D), a transferred image 41 is transferred to the image retaining substrate, such as ordinary paper (FIG. 1E).

The substrate used in the invention will be described in detail.

The substrate comprises a support, a conductive film and a photosemiconductor thin film laminated in this order. In the invention, because the light irradiation of the photosemiconductor thin film is conducted from the side of the photosemiconductor thin film through the electrodeposition solution, it is not necessary that the support and the conductive film are transparent to the irradiated light. Therefore, various materials, such as a metal, glass and plastics, can be used as the support, and can be selected depending on use.

As the conductive film, various materials having conductivity can be used. For example, a metal, such as Al, Zn, Cu, Fe, Ni and Cr, and a metal oxide, such as ITO (indium tin oxide) and tin dioxide, can be exemplified. Furthermore, a conductive carbon material and a conductive ceramic material can also be used. The conductive film can be formed on the support by the known method, such as the vapor deposition method, the sputtering method and the CVD method.

As the photosemiconductor film, any kind of material that forms a photoelectromotive force by irradiation of light can be employed. While a photosemiconductor has a photohysteresis effect, in which an effect occurring due to light irradiation is maintained for a certain period, one having a weak photohysteresis effect is preferably used in the invention. Even in the case of one having a strong photohysteresis effect, the photohysteresis effect can be made small by thinning the photosemiconductor thin film.

While the photosemiconductor includes an n-type photosemiconductor and a p-type photosemiconductor, both of them can be used in the invention. Furthermore, a photosemiconductor thin film having a pn junction formed by laminating an n-type photosemiconductor thin film and a p-type photosemiconductor thin film, or a photosemiconductor thin film having a pin junction formed by laminating an p-type photosemiconductor thin film, an i-type photosemiconductor thin film and a n-type photosemiconductor thin film is preferably used because a photoelectric current of high output can be certainly obtained, and contrast of the image can be high.

The photosemiconductor thin film used in the invention may be one comprising an inorganic photosemiconductor or one comprising an organic photosemiconductor. Examples of the inorganic photosemiconductor include SiGaN, a-C, BN, SiC, ZnSe, diamond, a GaAs series compound, CuS, $Zn_3P_2$, titanium oxide ($TiO_2$), zinc oxide (ZnO) and polysilicon. Examples of the organic photosemiconductor include a phthalocyanine series pigment, an azo series pigment, polyvinylcarbazole and polyacetylene. The photosemiconductor thin film may comprise a mixture of them or may be one obtained by laminating plural photosemiconductor thin films each comprising one of these materials. Among these, a metallic oxide, such as $TiO_2$ and ZnO, is preferred in repeated use since it is excellent in stability in electrodeposition and is also excellent in light irradiation efficiency. In particular, it has been found by recent studies that when $TiO_2$ is formed in to a film by various methods, such as the sol-gel method, the sputtering method and the electron beam vapor deposition method, a good n-type photosemiconductor thin film is obtained.

The photosemiconductor thin film is preferably composed only of a photosemiconductor, and preferably does not contain any insulating material, such as a resin. In the case where an insulating material, such as a resin, is mixed with the photosemiconductor thin film, the generation efficiency of the photoelectromotive force is lowered to increase the photohysteresis effect.

The photosemiconductor thin film can be formed on the conductive film by the conventionally known method, such as the sol-gel method, the sputtering method, the electron beam vapor deposition method, the ion coating method and the glow discharge film deposition method.

For example, as the method for forming an n-type photosemiconductor thin film by using $TiO_2$, the thermal oxidation method, the sputtering method, an electron beam method (EB method) and the sol-gel method are generally employed. In order to obtain a $TiO_2$ thin film having a sufficient photoelectromotive force, it is preferred that $TiO_2$ is previously subjected to a reduction treatment, and the film formation is conducted by using an anatase-type $TiO_2$ crystal. By using a crystal having a high optical activity, a photosemiconductor thin film having a high photosensitivity can be obtained with a heat treatment at a low temperature. For example, an n-type photosemiconductor thin film having a high photosensitivity can be obtained in such a manner that a dispersion (or a solution) obtained by dispersing (or dissolving) an anatase-type $TiO_2$ crystal in a solvent is coated on a conductive film, and then dried at a temperature of 100° C. or lower. When an anatase-type $TiO_2$ is subjected to a reduction treatment, an oxygen atom is released to form $TiO_{2-x}$ to further increase the optical activity. Examples of the method for the reduction treatment include a heat treatment in a hydrogen gas atmosphere. With respect to the heating condition, it is general that a treatment at a relatively high temperature for a relatively long period of time, such as heating at about 500° C. for 1 hour (*J. Electrochem. Soc.*, vol. 141, No. 3, p. 660 (1994), Y. Hamasaki et al.), is employed. However, the treatment can be conducted at a relatively low temperature for a relatively short period of time by conducting the heat treatment under a hydrogen-mixed nitrogen gas flow at a prescribed flowing rate. For example, $TiO_2$ powder can be reduced to $TiO_{2-x}$ at a relatively low temperature for a relatively short period of time by subjecting it to a heat treatment at about 360° C. for 10 minutes under a nitrogen gas containing 3% hydrogen flowing at 1 L/min.

The film thickness of the photosemiconductor thin film is not particularly limited, and it is preferably from 0.05 to 1.8 μm to obtain good characteristics. When the film thickness is less than 0.05 μm, the photoelectromotive force generated is too small, and there is a tendency that the image forming property is deteriorated. On the other hand, when it exceeds 1.8 μm, an electric charge formed by light irradiation is trapped inside the film to increase the photohysteresis, and thus there is a tendency that the image forming property is deteriorated.

The electrodeposition solution will be described.

The electrodeposition solution is obtained by dispersing or dissolving an electrodeposition material in an aqueous solvent. The electrodeposition material contains at least an ionic molecule that changes its solubility corresponding to the change of the pH of the solution, and a coloring material for coloring the electrodeposition film in a desired color, such as a dye, a pigment and a coloring matter. The coloring material itself needs not to have an electrodeposition function, but on electrodeposition, the ionic molecule is coagulated and deposited with incorporating the coloring material to form a colored electrodeposition film. In the case where the coloring material itself is an ionic molecule having an electrodeposition function, the electrodeposition material may be composed only of the coloring material. In the case where the process for recording an image of the invention is applied to the production of a color filter, it is preferred to use an electrodeposition material containing a pigment and an ionic polymer since the light resistance of the resulting electrodeposition film is increased.

The ionic molecule may be either an anionic molecule having an anionic dissociation group or a cationic molecule having a cationic dissociation group, and these may be selected depending on the polarity of the photosemiconductor thin film used.

The selection of the ionic molecule as the electrodeposition material can be made with reference to the characteristics of the change in solubility of the ionic molecule corresponding to the change of the pH. The electrodeposition material used in the invention preferably has characteristics in that the solubility quickly changes corresponding to the change in pH of the solution. For example, it exhibits the change in the form (dissolved state to precipitate, or precipitate to dissolved state) corresponding to the pH change of ±1.0, and preferably ±0.5 of the solution. By using the ionic molecule having such solubility characteristics, the electrodeposition film can be produced in a short period of time, and an electrodeposition film having an excellent water resistance can be produced.

Figure 2:
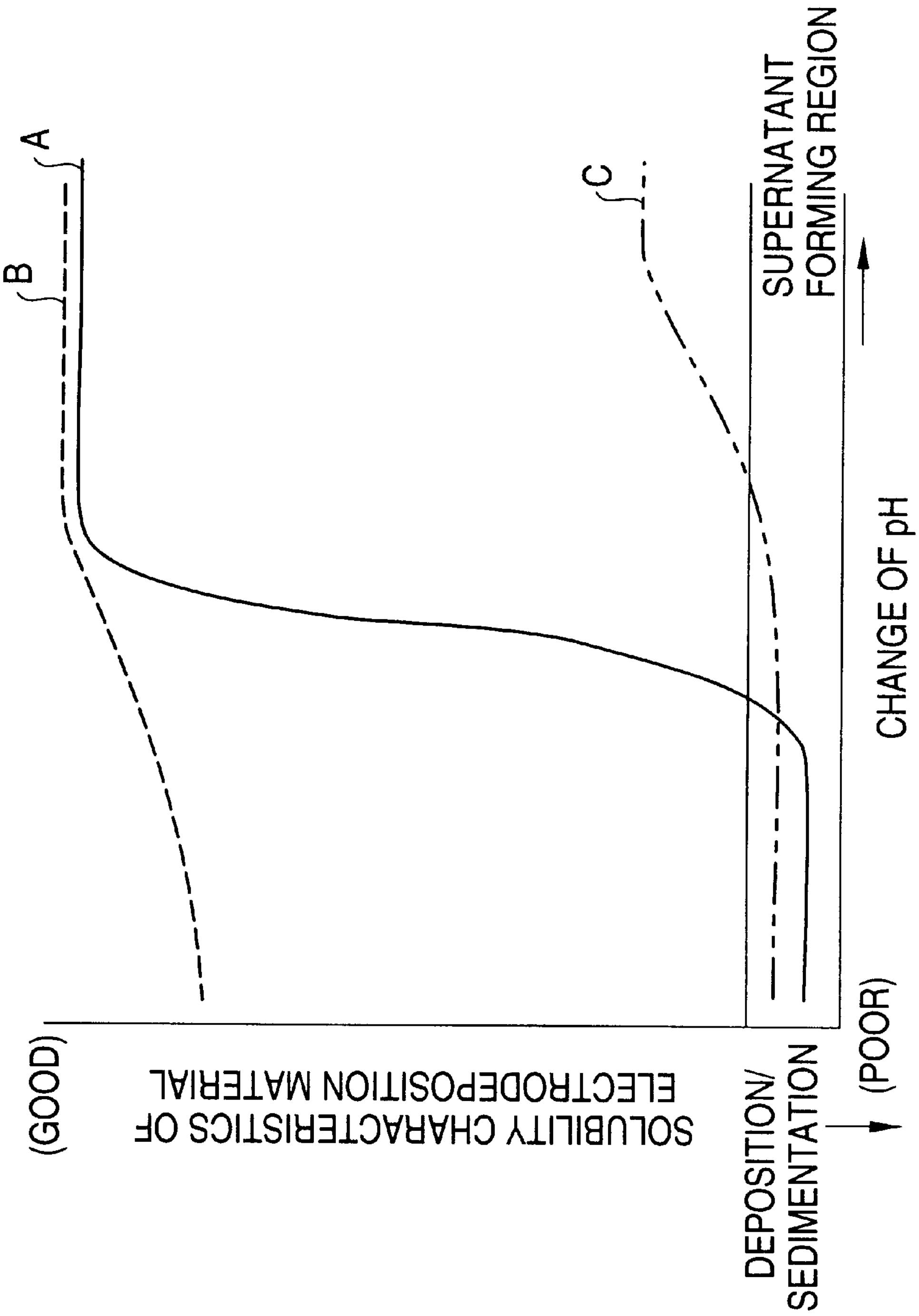
FIG. 2 is a graph showing the relationship between the change of pH of the electrodeposition solution and the solubility characteristics of the electrodeposition material.
Figure 3:
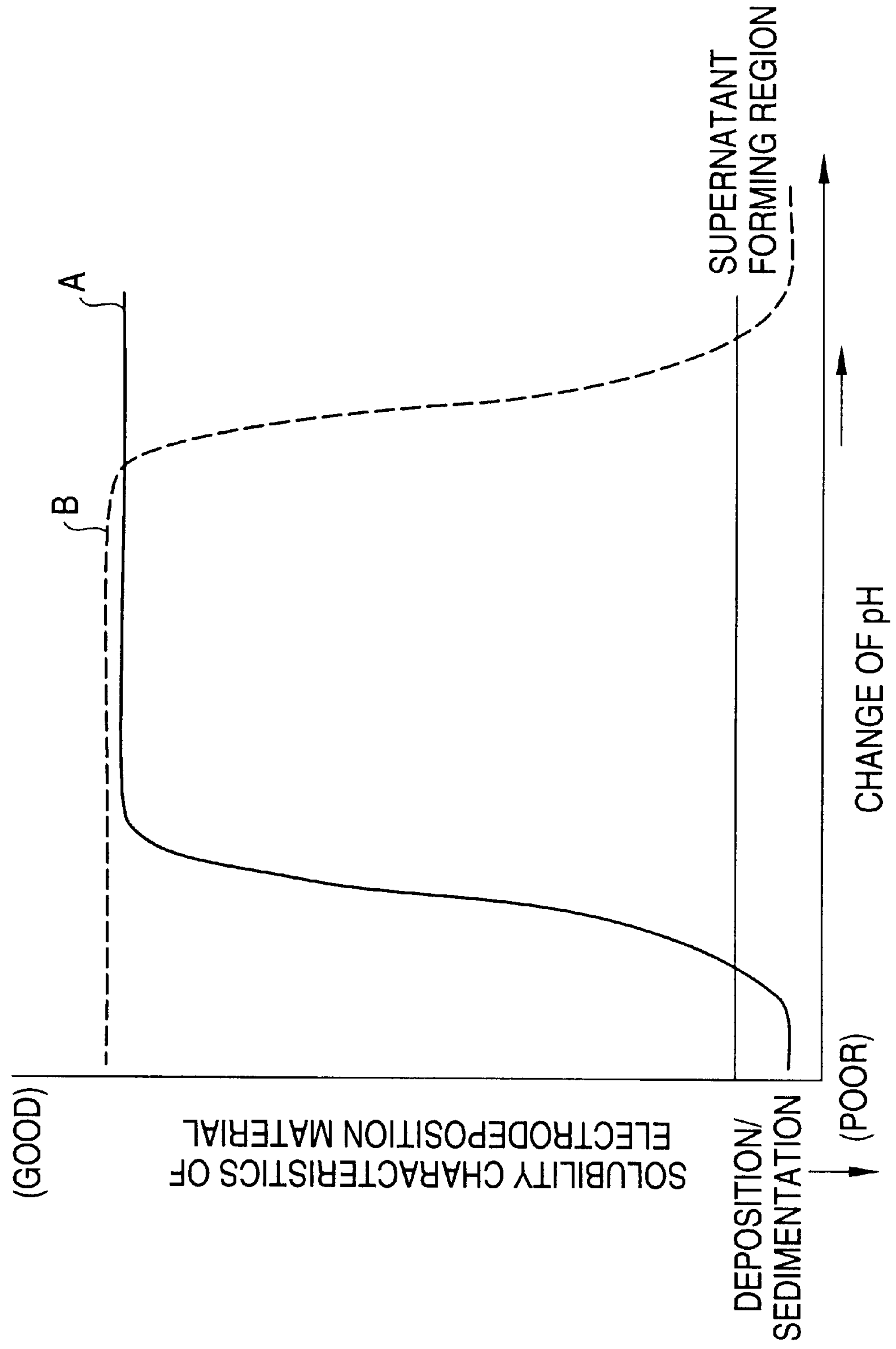
FIG. 3 is a graph showing the relationship between the change of the pH of the electrodeposition solution and the solubility characteristics of the electrodeposition material comprising an anionic molecule and the electrodeposition material comprising a cationic molecule.

FIG. 2 shows the relationship between the solubility characteristics of the ionic molecule and the change of pH of the solution. In FIG. 2, A shows the change in solubility characteristics of an ionic molecule that is preferred as the electrodeposition material, B shows that of an ionic molecule that is not preferred as the electrodeposition material, and C shows that of an ionic molecule that is low in electrodeposition response. FIG. 3 shows the relationship between the solubility characteristics of ionic molecules that are preferred as the electrodeposition material of the invention and the change of pH of the solution. A shows the solubility characteristics of an electrodeposition material of an anionic molecule, and B shows that of an electrodeposition material of a cationic molecule.

Furthermore, the ionic molecule used as the electrodeposition material preferably exhibits hysteresis in phase transition (change from dissolved state to deposition, and change from deposition to dissolved form) corresponding to the change of pH. That is, it is preferred that the change from the dissolved state to the deposited state due to decrease or increase of pH is quick, and the change from the deposited state to the dissolved state due to increase or decrease of pH is slow because the stability of the electrodeposition film is increased.

Examples of the ionic molecule include an anionic polymer having a carboxyl group as an anionic dissociation group, and a cationic polymer having an amino group or an imino group as a cationic dissociation group. The ionic polymer is preferably thermoplastic because the heat transfer of the electrodeposition film comprising the ionic polymer formed on a substrate to an image retaining substrate can be easily conducted. For example, a copolymer of a hydrophilic monomer having an ionic dissociation group and a hydrophobic monomer, and a random copolymer is particularly preferred.

Examples of the hydrophilic monomer having an anionic dissociation group include a monomer having a carboxyl group, such as methacrylic acid, acrylic acid, hydroxyethyl methacrylate, acrylamide, maleic anhydride, trimellitic anhydride, phthalic anhydride, hemimellitic acid, succinic acid, adipic acid, propidic acid, propionic acid, fumaric acid, itaconic acid, and a derivative thereof. Among these, an ionic polymer obtained from a monomer of methacrylic acid or acrylic acid is preferred since it exhibits quick phase transition due to the change of pH and has high hydrophilic property to an aqueous liquid.

Examples of the monomer having a cationic dissociation group include a monomer having an amino group or an imino group, such as a primary amine, a secondary amine, a tertiary amine, a quaternary ammonium compound, oxazoline, an alkylamine, an alkylimine, a polyamine and a polyimine. The cationic polymer having a cationic dissociation group may be a polymer, to which a cationic dissociation group, such as an amino group and an imino group, is introduced.

The hydrophilic monomer preferably contains an ionic dissociation group therein in a proportion of from 50 to 75% by weight. Two or more of the hydrophilic monomers may be used in combination.

Examples of the hydrophobic monomer include an olefin, such as ethylene and butadiene, styrene, α-methylstyrene, α-ethylstyrene, methyl methacrylate, ethyl methacrylate, butyl methacrylate, acrylonitrile, vinyl acetate, methyl acrylate, ethyl acrylate, butyl acrylate, lauryl acrylate and a derivative thereof. In particular, styrene and α -methylstyrene are preferred since they exhibit a high hydrophobic efficiency and a good electrodeposition efficiency. These are also preferred because they exhibit good controllability in copolymerization with the hydrophilic monomer. Two or more of the hydrophobic monomers may be used in combination.

In the case where the ionic polymer is used with the coloring material, the ionic polymer preferably forms a transparent electrodeposition film since the coloring of the coloring material is not inhibited. For example, a water-soluble acrylic resin is preferred.

The ionic polymer should have an appropriate hydrophilic property from the standpoint of the stability of the electrodeposition solution, and should have an appropriate hydrophobic property from the standpoint of film strength and water resistance of the electrodeposition film. Such a balance between the hydrophobic property and the hydrophilic property demanded in the ionic polymer can be expressed, for example, by the molar percentage of the hydrophobic monomer contained in the ionic polymer as described below, for example.

The ionic polymer preferably contains from 40 to 80% by mol of the hydrophobic monomer. It is more preferred from 55 to 70% by mol. When the content of the hydrophobic monomer is less than 40% by mol, it is not preferred since the water resistance and the film strength of the electrodeposition film is not sufficient. When the content of the hydrophobic monomer exceeds 80% by mol, it is not preferred since the affinity of the ionic polymer to the aqueous solvent is decreased to form a precipitate, or the viscosity of the electrodeposition solution becomes too high, so that a uniform electrodeposition film cannot be formed. The content of the hydrophobic monomer is preferably in the range described above, on the other hand, because the affinity to the aqueous solvent is high, the stability of the electrodeposition solution is high, and the electrodeposition efficiency is also high.

The balance between the hydrophobic property and the hydrophilic property of the ionic polymer can also be expressed by an acid value in the case where an anionic polymer is employed.

The acid value of the anionic polymer is preferably from 60 to 300, within which good electrodeposition characteristics can be obtained, and is particularly preferably from 70 to 195. When the acid value of the anionic polymer is less than 60, there may be the case where the affinity to an aqueous solvent is decreased, and thus the anionic polymer precipitates, or the viscosity of the electrodeposition solution becomes too high, so that a uniform electrodeposition film cannot be formed. When the acid value exceeds 300, on the other hand, there is a tendency that the water resistance of the electrodeposition film formed is decreased, and the electrodeposition efficiency is lowered.

The number average molecular weight of the ionic polymer used as the electrodeposition material is preferably from $6.0\times\ ^{3}$ to $2.5\times10^{4}$ in terms of number average molecular weight from the standpoint of the film characteristics of the electrodeposition film, and it is more preferably from $9.0\times10^{3}$ to $2.0\times10^{4}$. When the number average molecular weight is less than $6.0\times10^{3}$, there is a tendency that the film becomes non-uniform and exhibits insufficient water resistance. As a result, a crack may be formed during electrodeposition, or the electrodeposition film may become powder, resulting in that it is difficult to obtain an electrodeposition film having high durability. When the number average molecular weight exceeds $2.5\times10^{4}$, on the other hand, there may be the case where the affinity to an aqueous solvent is decreased to form a precipitate, or the viscosity of the electrodeposition solution becomes too high, so that the electrodeposition film becomes non-uniform.

The ionic polymer preferably has a glass transition point of 80° C. or less, a flow initiating point of 180° C. or less and a decomposition point of 150° C. or more since the transfer of an electrodeposition film comprising the ionic polymer formed on a substrate to an image retaining substrate can be easily controlled.

In the case where the electrodeposition material comprises an ionic coloring material, examples of the ionic coloring material include a dye of a triphenylmethane phthalide series, a phenothazine series, a phenothiazine series, a fluorescein series, an indolyl phthalide series, a spiropyran series, an aza phthalide series, a diphenyl methane series, a chromenopyrazole series, leucoauramine series, an azomethine series, a Rohodamine lactam series, a naphtholactam series, a triazene series, a triazole azo series, a thiazole azo series, an azo series, an oxazine series, a thiazine series, a benzthiazole azo series and a quinone imine series, and a hydrophilic dye having a carboxyl group, an amino group or an imino group.

For example, rose bengal and eosin, as fluoresceine series dyes, are in a reduced state and dissolved in an aqueous solution of pH 4 or more, but in an aqueous solution of pH of less than 4, they are in an oxidized state and precipitated. Cathilon Pure Blue 5GH (C.I. Basic Blue 3) as an oxazine series basic dye, and Methylene Blue (C.I. Basic Blue 9) as a thiazine series basic dye are in an oxidized state and dissolved in water of pH 10 or less, but in water of pH of more than 10, they are in a reduced state to be insolubilized and precipitated.

While not accompanying any structural change, a hydrophilic dye having a carboxyl group, an amino group or an imino group changes its solubility depending on the change of pH of the aqueous solution. For example, an ink-jet dye containing a carboxyl group having improved water resistance is soluble in water having pH 6 or more but insoluble in water of pH of less than 6.

The electrodeposition solution is used by dissolving or dispersing the electrodeposition material in an aqueous solvent. The aqueous solvent used herein mainly comprises water, to which another solvent having affinity with water, such as an alcohol, and various salts and additives are added in such an amount that the effect of the invention is not impaired.

Figure 4:
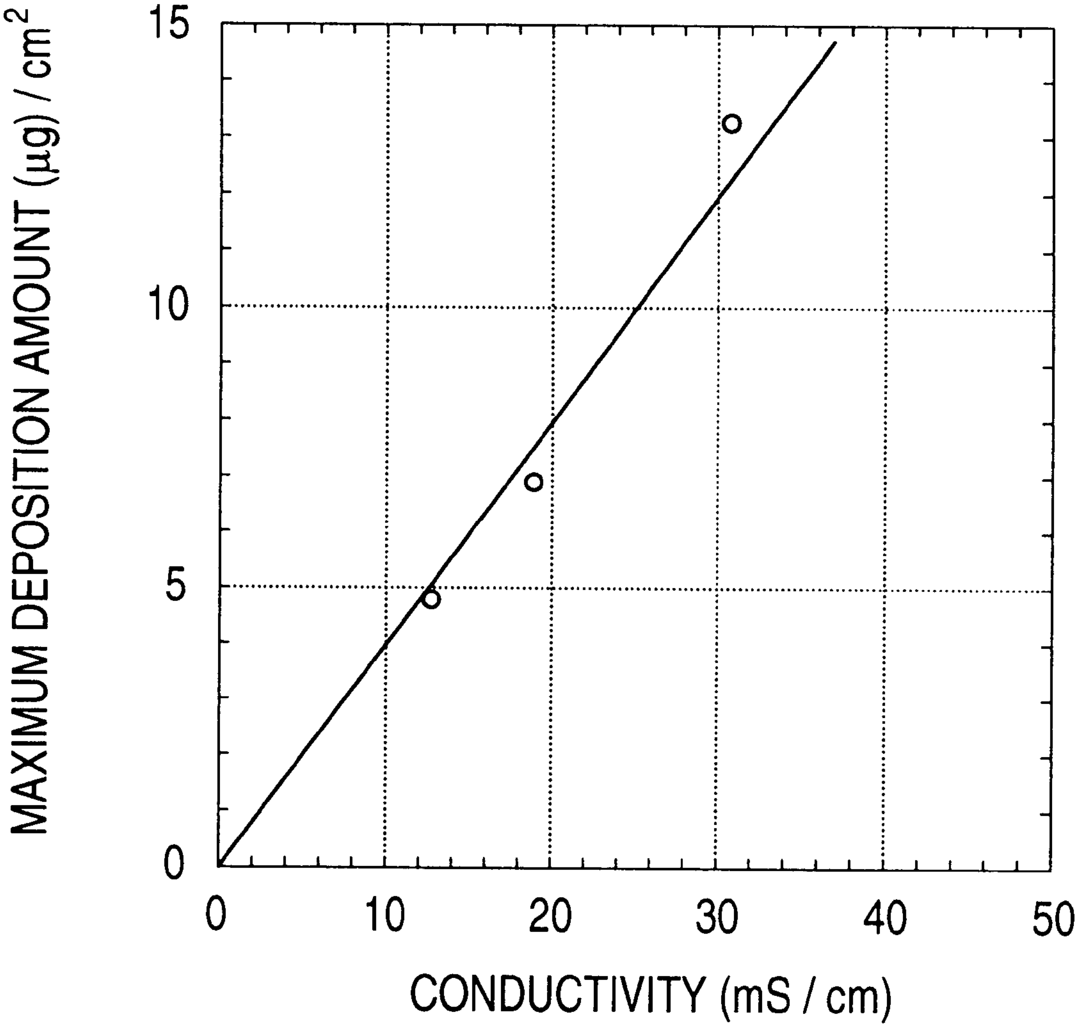
FIG. 4 is a graph showing the relationship between the conductivity of the electrodeposition solution and the electrodeposition amount.

Into the electrodeposition solution, an electrolyte other than the electrodeposition material may be added to increase the electrodeposition rate. The conductivity of the solution is increased by adding an electrolyte thereto. As a result of the investigation by the inventors, the electrodeposition rate (i.e., the electrodeposition amount) interrelates to the conductivity of an aqueous liquid (see FIG. 4). The higher the conductivity is, the larger the film thickness of the electrodeposition film formed within a certain period of time, and the electrodeposition rate is saturated at a conductivity of about 100 $mS/cm^2$ (which corresponds to 10 Ω·cm). Therefore, the electrodeposition rate can be increased by adding an ion that does not influence the formation of the electrodeposition film, such as an $Na^+$ ion and a $Cl^-$ ion.

The pH of the electrodeposition solution before irradiation of light is preferably set within the range of ±2 of the pH, at which the phase transition of the electrodeposition material occurs. By setting the pH of the electrodeposition solution within such a range, the electrodeposition material is dissolved in the aqueous solvent in a saturated condition before forming the electrodeposition film. As a result, the electrodeposition film can be stably formed because once the electrodeposition film is formed, the electrodeposition film is difficult to be dissolved into the electrodeposition solution after the formation thereof. On the other hand, in the case where the electrodeposition material is in a unsaturated condition on the formation of the electrodeposition film, even when once the electrodeposition film is formed, the film is dissolved into the solution immediately after stopping the application of an electric current. The pH of the electrodeposition solution is controlled by adding an acidic or alkaline substance that does not influence the electrodeposition characteristics.

On arranging the substrate into the electrodeposition solution, it is arranged in such a manner that at least the photosemiconductor thin film comes into contact with the electrodeposition solution. In the invention, since the irradiation of light is conducted through the electrodeposition solution, the effective thickness of the electrodeposition solution, through which the irradiated light passes, is preferably as thin as possible because the decrease in intensity of light due to light scattering before the light reaches the photosemiconductor thin film can be suppressed, so that the light irradiation efficiency ((the light irradiation energy at the surface of the photosemiconductor thin film/the emission energy of the light source)×100 (%)) can be maintained high. The light irradiation efficiency is preferably 5% or more, and more preferably 30% or more. On the other hand, when the effective thickness of the electrodeposition solution attached to the photosemiconductor thin film is too thin, an electrodeposition film having a sufficient film strength cannot be formed. As a result of earnest investigation with taking these circumstances into consideration, it has been found that the thickness of the electrodeposition solution layer is preferably from 20 μm to 15 mm, and more preferably from 100 μm to 3 mm. When the effective thickness of the electrodeposition solution is less than 20 μm, the supplying property of the electrodeposition solution to the photosemiconductor thin film is lowered to decrease the optical density of an image or to cause unevenness in the optical density. When it exceeds 15 mm, on the other hand, the light irradiation efficiency is decreased, and there may be the case where a sufficient difference in optical density between the image-forming region and the non-image-forming region cannot be obtained.

The change of pH of the aqueous liquid occurring in the vicinity of the substrate, and the formation mechanisms of the electrodeposition film accompanying thereto will be described.

In general, when an electric current or a voltage is applied to a platinum electrode immersed in an aqueous solution, an $OH^-$ ion in the vicinity of an anode is consumed to become $O_2$, and the amount of a hydrogen ion is increased to lower the pH. This is because the following reaction of combining a hole (p) and an $OH^-$ ion occurs in the vicinity of the anode.

$$2OH^- + 2p^+ \rightarrow 1/2(O_2) + H_2O$$

To cause the reaction, it is necessary that the electric potential of the substrate exceeds a certain value (threshold electric potential). When the potential exceeds the threshold electric potential, then the reaction proceeds to change the pH of the aqueous solution (i.e., the pH is decreased in the vicinity of the anode, and the pH is increased in the vicinity of the cathode).

In the invention, an photoelectromotive force is caused in the photosemiconductor by light irradiation while applying a bias by previously applying an electric current or a voltage to the substrate, to make only the electric potential of the light irradiated part exceed the threshold electric potential, and thus the reaction is caused only in the aqueous solution in the vicinity of the light irradiated part of the substrate. As a result of proceeding of the reaction, the pH of the aqueous solution in the vicinity of the light irradiated part is changed to change the solubility of the colored electrodeposition material corresponding thereto, and thus a colored electrodeposition film is formed only on the light irradiated part.

An attempt to cause an electrochemical reaction by a photoelectromotive force has been variously investigated. For example, A. Fujishima, K. Honda, *Nature,* vol. 238, p. 37 (1972) reports an example, in which $TiO_2$ as an n-type semiconductor is irradiated with light, and electrolysis of water is conducted with the photoelectromotive force thus formed. As an example of image formation utilizing a photoelectromotive force, H. Yoneyama, et al., *J. Electrochem. Soc.,* p. 2414 (1985) reports an example, in which an Si substrate is irradiated with light, and pyrrol is electrolytically polymerized with a photoelectromotive force thus formed, to conduct image formation by doping and dedoping. The inventors have filed an application for patent for a process for producing an image with light by using a coloring substance for doping and dedoping of a conductive polymer. However, in the case where image formation is conducted with a conductive polymer by utilizing a photoelectromotive force, there is a restriction in the usable coloring material. As a result, the formation of a multicolor image is difficult.

While an electrodeposition film can be formed even in the system containing no conductive polymer, the voltage required for forming the electrodeposition film becomes large in comparison to the case where the conductive polymer is present. For example, JP-A-5-119209"Process for producing Color Filter and Electrodeposition Substrate for producing Color Filter" and JP-A-5-157905"Process for producing Color Filter" disclose a technique, in which a photosemiconductor thin film is irradiated with light, and an electrodeposition film is formed by utilizing a photoelectric conductivity occurring in the light irradiated part, but the voltage applied is from 20 to 100 V, and the electrodeposition material utilizes a redox reaction of a polymer. On the other hand, a photoelectromotive force of a photosemiconductor thin film is less than 1 V (for example, about 0.6 V for Si), and the use of only the photoelectromotive force is insufficient to form an image. While it can be considered to previously increase the electric potential by applying an electric current or a voltage, when a voltage exceeding a certain value (voltage corresponding to the band gap of the photosemiconductor used) is applied, the Schottky barrier between the semiconductor and the electrodeposition solution is broken to make the image formation impossible. In the invention, no redox reaction of a polymer is utilized for electrodeposition, but the formation of an electrodeposition film is conducted by utilizing the change in solubility of the electrodeposition material corresponding to the change of pH in the electrodeposition solution, and therefore a thin film can be formed by applying a low voltage.

In the invention, the electric current or the voltage that is previously applied to the substrate (a light-transmissible conductive film in the substrate) must be so set that it supplements the electric potential formed in the substrate by the photoelectromotive force exhibited by the photosemiconductor thin film, so that the electric potential of the substrate reaches the threshold electric potential. Furthermore, the electric current or the voltage that is previously applied to the substrate (a light-transmissible conductive film in the substrate) also must be so set that it does not exceed the Schottky barrier. When the electric current or the voltage that is previously applied to the substrate is too large, the Schottky barrier is broken, and the electric current flows in the region that is not irradiated with light to form an electrodeposition film on the whole region of the photosemiconductor substrate. As a result, the position of the formation of the colored electrodeposition film cannot be controlled.

For example, since the photoelectromotive force of $TiO_2$ is about 0.6 V, in the case of an electrodeposition material that exhibits electrodeposition at 2.0 V, when the light irradiation is conducted with applying a bias voltage of 1.4 V, the electric potential at the light irradiated part of the substrate (photosemiconductor film) becomes 0.6 V+1.4 V=2.0 V to exceed the threshold electric potential required for electrodeposition, and the colored electrodeposition film is formed only on the light irradiated part. On the other hand, when a bias voltage of more than 2.5 V is applied to the substrate, the Schottky barrier is broken.

The combination of the photosemiconductor and the colored electrodeposition material will be described.

Figure 5A:
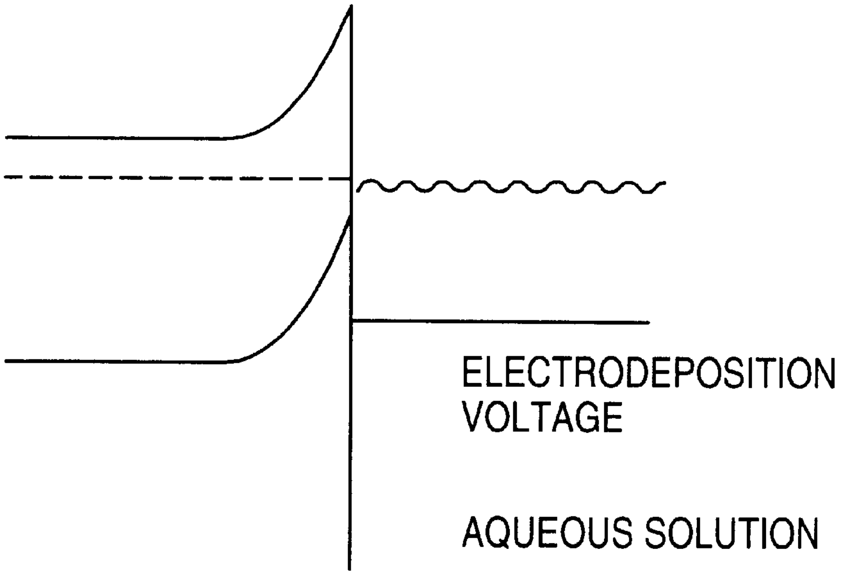
FIG. 5A is a schematic diagram showing the Schottky barrier formed at the interface between the photosemiconductor thin film and the electrodeposition solution.
Figure 5B:
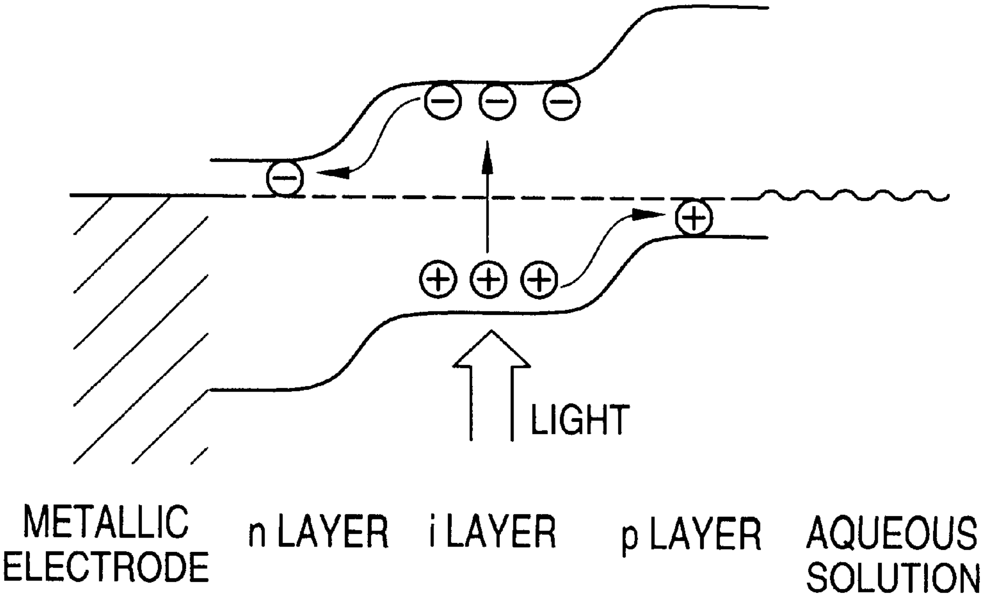
FIG. 5B is a schematic diagram showing the energy band of the photosemiconductor having a pin junction.

In the invention, the Schottky barrier formed at the interface in contact with the photosemiconductor and the barrier of a pn junction or a pin junction are utilized for forming a photoelectromotive force. FIG. 5A schematically shows a Schottky barrier formed at the interface between an n-type photosemiconductor and an electrodeposition solution, and FIG. 5B schematically shows an energy band of a pin junction. For example, in the case where an n-type photosemiconductor is used (FIG. 5A), when the n-type photosemiconductor is used in the negative side, the electric current flows since its direction is the forward direction, but the n-type photosemiconductor is used in the positive side, the electric current does not flow since the Schottky junction of the n-type photosemiconductor and the aqueous liquid forms a barrier. However, even in the state where an electric current does not flow with using the n-type photosemiconductor in the positive side, an electron/hole pair is formed from the n-type photosemiconductor thin film by irradiation with light, and the hole migrates to the solution side, so that an electric current flows. In this case, a material to be subjected to electrodeposition must be an anionic molecule since a positive electric potential is applied to the n-type photosemiconductor. Therefore, the combination of an n-type photosemiconductor and an anionic molecule is employed, and, on the other hand, in the case of a p-type photosemiconductor, a cation is subjected to electrodeposition. In particular, a colored electrodeposition material containing an anionic molecule having a carboxyl group is preferably used in the case where an n-type photosemiconductor is used, and a colored electrodeposition material containing a cationic molecule having an amino group or an imino group is preferably used in the case where a p-type photosemiconductor is used.

Means for applying an electric current or a voltage to the conductive film will be described.

In order to apply an electric current or a voltage to the conductive film, an electric circuit for applying an electric current or a voltage is provided, for example, at a side edge of the conductive film.

For applying an electric current or a voltage, a potentiostat, for example, is used.

The light irradiation to the photosemiconductor thin film will be described.

Since the light irradiation to the photosemiconductor thin film is conducted through the electrodeposition solution, the wavelength of the irradiation light is preferably within such a wavelength range that there is no light absorption by the electrodeposition solution, or even though there is light absorption, the absorbance thereof is small. That is, the dominant wavelength range of the irradiation light preferably differs from the dominant absorption wavelength range of the electrodeposition solution. In the case where a color image is recorded, since an electrodeposition solution absorbing a visible rays is used, the irradiation light is preferably an ultraviolet ray having a wavelength of 400 nm or less, or a near infrared ray or an infrared ray having a wavelength of 700 nm or more. As a light source of such rays, conventional light sources may be variously employed, such as a mercury lamp, a mercury-xenon lamp, a He—Cd laser, a gas laser, an excimer laser, a He—Ne laser, a semiconductor laser and an infrared laser.

The irradiation light must fall within such a wavelength range that the light causes a photoelectromotive force in the photosemiconductor thin film. For example, a photosemiconductor, such as titanium dioxide and zinc oxide, generates a photoelectromotive force by irradiation with an ultraviolet ray. On the other hand, polysilicon and a phthalocyanine series compound generate a photoelectromotive force by irradiation with an infrared ray. The light source of the irradiation light can be so appropriately selected that the photosemiconductor used is sensitive to the light.

A method for imagewise irradiating with light includes a method of exposing the whole surface with a mercury lamp or a mercury-xenon lamp through a photomask, and a method of scanning exposure by using a laser.

In the case where the process for recording an image according to the invention is applied to a process for producing a color filter, a black matrix can be easily formed on a region, on which an electrodeposition film is not formed, of the substrate. Because the photosemiconductor is exposed on the region, on which an electrodeposition film is not formed, a black mask can be easily formed by utilizing the same. Specifically, a substrate having an RGB layer formed by the process for recording an image of the invention is arranged in an electrodeposition solution containing a black electrodeposition material for forming a black matrix, and a voltage is so applied that the electric potential of the conductive film of the substrate exceeds the threshold electric potential to precipitate the electrodeposition material on the conductive film of the substrate, so as to form a black matrix only on the region, on which the electrodeposition film is not formed. Examples of the black electrodeposition material used include mixtures of carbon black and the ionic polymers described above. In the case where the black matrix is formed according to such a process, in order not to cover the electrodeposition film with the black matrix, the electrodeposition material is selected in such a manner that the red, green and blue electrodeposition films are electrically insulating. As the standard of the insulating property, the electrodeposition material is selected so that the volume resistivity of the electrodeposition film is $1.0\times10^3$ Ω·cm or more, and more preferably $1.0\times10^4$ Ω·cm or more.

Other than a color filter, an electrodeposition film of a background color of an image can be formed on the region, on which the electrodeposition film is not formed, in the similar manner. Specifically, a substrate having an electrodeposition film of at least one color formed by the process for recording an image of the invention is brought into contact with an electrodeposition solution containing an electrodeposition material capable of forming the electrodeposition film of the background color, and an electric current or a voltage is applied to make the substrate have an electric potential necessary for electrodeposition of the electrodeposition material, so as to easily form the electrodeposition film of the background color. In this case, light irradiation is not particularly necessary when the voltage applied is adjusted. Even in the case where light irradiation is conducted, control of the position of the light irradiation is not necessary, but the whole surface may be exposed to light. As the electrodeposition material, a material that can form an insulating electrodeposition film is selected to prevent the electrodeposition film forming an image from being covered with the electrodeposition film of the background color. The standard of the insulating property is the same as above.

An electrodeposition film constituting an image formed on a substrate according to the process for recording an image of the invention is transferred to an image retaining substrate depending on necessity. Since the electrodeposition film formed on the substrate contains water, it exhibits viscous deformation by a little nip pressure applied by an elastic roller, and it can be easily transferred to the image retaining substrate. In order to improve the transfer efficiency, the transfer may be conducted while applying heat. In order to conduct the transfer without breakage of the image, the highest heating temperature should be 20° C. higher than the decomposition point of the ionic polymer constituting the electrodeposition film. The lowest heating temperature is preferably set to the glass transition point of the ionic polymer from the standpoint of the transfer efficiency.

For example, when a step of transferring the electrodeposition film constituting an image formed on the substrate to ordinary paper is added to the process for recording an image of the invention, it can be suitably applied to a printing machine for office use. Also when a step of transferring the RGB layers and the black matrix formed on the substrate to a light-transmissible glass substrate or a light-transmissible plastic film is added, it can be suitably applied to a process for industrially producing a color filter.

Figure 6:
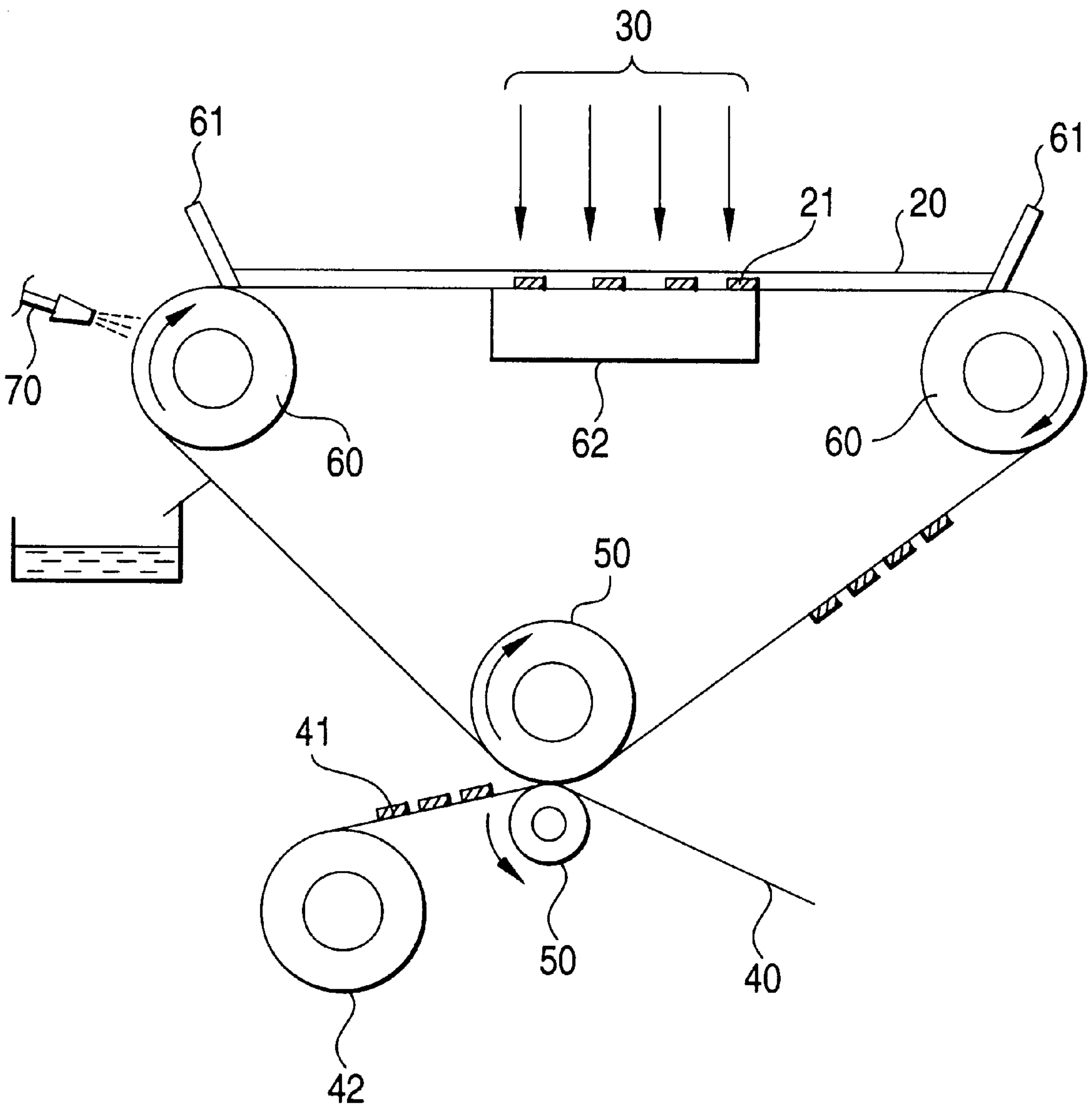
FIG. 6 is a schematic diagram showing an example of an image recording apparatus utilizing the process for recording an image according to the invention.

FIG. 6 is a schematic diagram showing one example of an image recording apparatus utilizing the process for recording an image according to the invention. A substrate 10 in the form of an endless belt comprises a support, a conductive thin film and a photosemiconductor thin film laminated in this order, and the outside is the photosemiconductor thin film and the inside is the support in FIG. 6. An electric circuit is provided to the conductive film, which is biased by applying an electric current or a voltage. The substrate 10 is conveyed by driving rollers 60. The substrate 10 comes in contact with an electrodeposition solution 20 at the prescribed position, and the photosemiconductor thin film is irradiated with light 30 to form an electrodeposition film 21 on the light irradiated part. The electrodeposition film 21 is conveyed to a nip part of an elastic heating roller in the state of adhered on the substrate 10. The electrodeposition film 21 is transferred to an image retaining substrate 40 by a nip pressure and heat applied by the elastic heating roller.

The invention will be described in more detail with reference to the following example, but the invention is not construed as being limited thereto.

EXAMPLE 1

An ITO conductive film having a thickness of 0.5 μm was formed on a glass substrate having a thickness of 5 mm by a sputtering method, and a $TiO_2$ thin film having a thickness of 0.5 μm was further formed thereon by the same method. As a reduction treatment to increase the photoelectric current characteristics of $TiO_2$, the substrate was annealed by heating at 410° C. for 10 minutes in a nitrogen gas containing 3% of a hydrogen gas.

The resulting substrate was arranged in such a manner that the $TiO_2$ thin film came in contact with an electrodeposition solution, in which a styrene-acrylic acid random copolymer (molecular weight: $1.6\times10^4$, mole percentage of styrene: 72%, acid value: 130, glass transition point: 40° C., flow initiating point: 85° C., decomposition point: 240° C.) and azo series magenta pigment super-fine particles were dispersed at a solid content ratio of 8/2. The electrodeposition solution had a maximum absorption wavelength of 546 nm and a volume resistivity of $3\times10^2$ ·cm.

In the three-electrode arrangement that was generally used in the field of electrochemistry, the substrate was used as a working electrode with respect to a saturated calomel electrode, and a voltage was applied to the ITO conductive film to make the electric potential of the working electrode being 1.6 V. The $TiO_2$ thin film was exposed to light for 10 seconds from the outside of the electrodeposition solution having a thickness of 3 mm through a photomask of a mask pattern image by using a mercury-xenon lamp (produced by Yamashita Denso Corp., wavelength: 365 nm, light intensity: 50 mW/cm$^2$). A magenta image pattern was formed on the light irradiated part of the surface of the $TiO_2$ thin film.

The substrate having the magenta electrodeposition film was arranged in such a manner that the $TiO_2$ thin film came in contact with an electrodeposition solution (maximum absorption wavelength: 446 nm, volume resistivity $5\times10^2$ Ω·cm), in which the styrene-acrylic acid random copolymer and azo series yellow pigment super-fine particles were dispersed at a solid content ratio of 8/2. The substrate was used as a working electrode with respect to a saturated calomel electrode, and a voltage was applied to make the electric potential of the working electrode being 1.7 V. The $TiO_2$ thin film was exposed to light for 10 seconds from the outside of the electrodeposition solution having a thickness of 3 mm through a photomask of a mask pattern image by using a mercury-xenon lamp (produced by Yamashita Denso Corp., wavelength: 365 nm, light intensity: 50 mW/cm$^2$). A yellow image pattern was formed on the light irradiated part of the surface of the $TiO_2$ thin film.

The substrate having the electrodeposition films of two colors was arranged in such a manner that the $TiO_2$ thin film came in contact with an electrodeposition solution (maximum absorption wavelength: 658 nm, volume resistivity $2\times10^2$ Ω·cm), in which the above-described styrene-acrylic acid random copolymer and phthalocyanine series cyan pigment super-fine particles were dispersed at a solid content ratio of 8/2. The substrate was used as a working electrode with respect to a saturated calomel electrode, and a voltage was applied to make the electric potential of the working electrode being 1.7 V. The $TiO_2$ thin film was exposed to light for 10 seconds from the outside of the electrodeposition solution having a thickness of 3 mm through a photomask of a mask pattern image by using a mercury-xenon lamp (produced by Yamashita Denso Corp., wavelength: 365 nm, light intensity: 50 mW/cm$^2$) A cyan image pattern was formed on the light irradiated part of the surface of the $TiO_2$ thin film. The volume resistivity of the electrodeposition films of three colors was $5\times10^4$ Ω·cm.

After washing the substrate having the electrodeposition films of three colors with pure water, the substrate was arranged in such a manner that the $TiO_2$ thin film came in contact with an electrodeposition solution, in which a styrene-acrylic acid random copolymer (number average molecular weight: $1.3\times10^4$ a styrene-acrylic acid random copolymer (molecular weight: $1.6\times10^4$, mole ratio of styrene ((molar concentration of styrene)/(molar concentration of acrylic acid + molar concentration of styrene)): 70% by mol, acid value: 50) and carbon black powder (average particle diameter: 80 nm) were dispersed at a solid content ratio of 1/4. The substrate was used as a working electrode with respect to a saturated calomel electrode, and a voltage was applied to make the electric potential of the working electrode being 2.0 V for 3.0 seconds. A black thin film was formed on the region, on which the colored electrodeposition films were not formed.

After washing the substrate with water, ordinary paper was put on the electrodeposition films, and a pressure of 200 g/cm$^2$ was applied on the side of the ordinary paper for 10 minutes in an oven at 190° C. After withdrawing from the oven, the ordinary paper was peeled from the substrate, and it was found that the colored electrodeposition films were transferred onto the ordinary paper. The image recorded on the ordinary paper had a resolution of 1,200 dpi and a gradation of 256 steps, and thus a color document having a high resolution and a high colorfulness could be produced.

EXAMPLE 2

An ITO conductive film having a thickness of 0.2 μm was formed on a non-alkali glass substrate having a thickness of 4 mm by a sputtering method, and a $TiO_2$ thin film having a 0.5 μm was further formed thereon by the same method. As a reduction treatment to increase the photoelectric current characteristics of $TiO_2$, the substrate was annealed by heating at 37° C. for 20 minutes in an argon gas containing 4% of hydrogen gas.

The resulting substrate was arranged in such a manner that the $TiO_2$ thin film came in contact with an electrodeposition solution, in which a styrene-acrylic acid random copolymer (number average molecular weight: $1.9\times10^4$, molar percentage of styrene: 70%, acid value: 160, glass transition point: 47° C. flow initiating point: 95° C., decomposition point: 244° C.) and azo series red pigment super-fine particles were dispersed at a solid content ratio of 7/3. The electrodeposition solution had a maximum absorption wavelength of 446 nm and a volume resistivity of $6\times10^2$ Ω·cm. In the three-electrode arrangement that was generally used in the field of electrochemistry, the substrate was used as a working electrode with respect to a saturated calomel electrode, and a voltage was applied to the ITO conductive film to make the electric potential of the working electrode being 1.9 V. The $TiO_2$ thin film was exposed to light for 7 seconds from the outside of the electrodeposition solution having a thickness of 1 mm through a photomask for a red image by using a mercury-xenon lamp (produced by Yamashita Denso Corp., wavelength: 365 nm, light intensity: 50 mW/cm$^2$). A red image pattern was formed on the light irradiated part of the surface of the $TiO_2$ thin film.

The substrate having the red electrodeposition film was arranged in such a manner that the $TiO_2$ thin film came in contact with an electrodeposition solution (maximum absorption wavelength: 646 nm, volume resistivity $8\times10^2$ Ω·cm), in which the above-described styrene-acrylic acid random copolymer and phthalocyanine series green pigment super-fine particles were dispersed at a solid content ratio of 8/2. The substrate was used as a working electrode with respect to a saturated calomel electrode, and a voltage was applied to make the electric potential of the working electrode being 1.9 V. The $TiO_2$ thin film was exposed to light for 10 seconds from the outside of the electrodeposition solution having a thickness of 1 mm through a photomask for a green image by using a mercury-xenon lamp (produced by Yamashita Denso Corp., wavelength: 365 nm, light intensity: 50 mW/cm$^2$). A green image pattern was formed on the light irradiated part of the surface of the $Ti_2$ thin film.

The substrate having the electrodeposition films of two colors was arranged in such a manner that the $TiO_2$ thin film came in contact with an electrodeposition solution (maximum absorption wavelength: 652 nm, volume resistivity $9\times10^2$ Ω·cm), in which the above-described styrene-acrylic acid random copolymer and phthalocyanine series blue pigment super-fine particles were dispersed at a solid content ratio of 8/2. The substrate was used as a working electrode with respect to a saturated calomel electrode, and a voltage was applied to make the electric potential of the working electrode being 1.9 V. The $TiO_2$ thin film was exposed to light for 10 seconds from the outside of the electrodeposition solution having a thickness of 1 mm through a photomask of a blue image by using a mercury-xenon lamp (produced by Yamashita Denso Corp., wavelength: 365 nm, light intensity: 50 mW/cm$^2$). A blue image pattern was formed on the light irradiated part of the surface of the $TiO_2$ thin film. The volume resistivities of the electrodeposition films of three colors were $6\times10^5$ Ω·cm, $3\times10^6$ Ω·cm, and $5\times10^6$ Ω·cm, respectively.

After washing the substrate having the electrodeposition films of three colors with pure water, the substrate was arranged in such a manner that the $TiO_2$ thin film came in contact with an electrodeposition solution, in which the above-described styrene-acrylic acid random copolymer and carbon black powder (average particle diameter: 95 nm) were dispersed at a solid content ratio of 5/5. The substrate was used as a working electrode with respect to a saturated calomel electrode, and a voltage was applied to make the electric potential of the working electrode being 2.6 V for 4 seconds. The region, on which the colored electrodeposition films were not formed, was covered with a black thin film to form a black matrix.

After washing the substrate with water, a blue glass having a thickness of 1 mm was put on the electrodeposition films, and a pressure of 400 g/cm$^2$ was applied on the side of the blue glass for 20 minutes in an oven at 220° C. After withdrawing from the oven, the blue glass was peeled from the substrate, and it was found that the colored electrodeposition films were transferred onto the blue glass. Thereafter, a protective layer was formed on the color filter layer constituted by the transferred colored electrodeposition films by coating a dilute solution of a polyimide resin, followed by drying, so as to produce a color filter of the VGS specification. The color filter obtained had a high smoothness and a high light transmissibility and exhibited a high resolution.

EXAMPLE 3

A gold conductive film having a thickness of 0.5 μm was formed on an alumina substrate having a thickness of 3 mm by a sputtering method, and a $TiO_2$ thin film having a 0.6 μm was further formed thereon by a sol-gel method. The film formation was conducted by spin coating an alkoxide solution of $TiO_2$ (1,700 revolutions per second for 30 second). In order to increase the photoelectric current characteristics of the photosemiconductor thin film, the same reduction treatment as in Example 1 was conducted.

The resulting substrate was arranged in such a manner that the $TiO_2$ thin film came in contact with an electrodeposition solution, in which a styrene-acrylic acid random copolymer (number average molecular weight: $1.0 \times 10^4$, molar percentage of styrene: 65%, acid value: 145, glass transition point: 425° C. flow initiating point: 65° C. decomposition point: 200° C.) and azo series red pigment super-fine particles were dispersed at a solid content ratio of 9/1. The electrodeposition solution had a maximum absorption wavelength of 456 nm and a volume resistivity of $2 \times 10^3$ Ω·cm. In the three-electrode arrangement that was generally used in the field of electrochemistry, the substrate was used as a working electrode with respect to a saturated calomel electrode, and a voltage was applied to the gold conductive film to make the electric potential of the working electrode being 1.7 V. The $TiO_2$ thin film was exposed to light for 5 seconds from the outside of the electrodeposition solution having a thickness of 0.5 mm through a photomask for a red image by using a mercury-xenon lamp (produced by Yamashita Denso Corp., wavelength: 365 nm, light intensity: 50 $mW/cm^2$). A red image pattern was formed on the light irradiated part of the surface of the $TiO_2$ thin film.

The substrate having the red electrodeposition film was arranged in such a manner that the $TiO_2$ thin film came in contact with an electrodeposition solution (maximum absorption wavelength: 656 nm, volume resistivity $2 \times 10^2$ Ω·cm), which the styrene-acrylic acid random copolymer and phthalocyanine series green pigment super-fine particles were dispersed at a solid content ratio of 9/1. The substrate was used as a working electrode with respect to a saturated calomel electrode, and a voltage was applied to make the electric potential of the working electrode being 1.7 V. The $TiO_2$ thin film was exposed to light for 5 seconds from the outside of the electrodeposition solution having a thickness of 0.5 mm through a photomask for a green image by using a mercury-xenon lamp (produced by Yamashita Denso Corp., wavelength: 365 nm, light intensity: 50 $mW/cm^2$). A green image pattern was formed on the light irradiated part of the surface of the $TiO_2$ thin film.

The substrate having the electrodeposition films of two colors was arranged in such a manner that the $TiO_2$ thin film came in contact with an electrodeposition solution (maximum absorption wavelength: 646 nm, volume resistivity $1.5 \times 10^2$ Ω·cm), in which the above-described styrene-acrylic acid random copolymer and phthalocyanine series blue pigment super-fine particles were dispersed at a solid content ratio of 9/1. The substrate was used as a working electrode with respect to a saturated calomel electrode, and a voltage was applied to make the electric potential of the working electrode being 1.7 V. The $TiO_2$ thin film was exposed to light for 10 seconds from the outside of the electrodeposition solution having a thickness of 0.5 mm through a photomask of a blue image by using a mercury-xenon lamp (produced by Yamashita Denso Corp., wavelength: 365 nm, light intensity: 50 $mW/cm^2$). A blue image pattern was formed on the light irradiated part of the surface of the $TiO_2$ thin film. The volume resistivities of the electrodeposition films of three colors were $3 \times 10^6$ Ω·cm, $7 \times 10^6$ Ω·cm, and $4 \times 10^7$ Ω·cm, respectively.

After washing the substrate having the electrodeposition films of three colors with pure water, the substrate was arranged in such a manner that the $TiO_2$ thin film came in contact with an electrodeposition solution, in which the above-described styrene-acrylic acid random copolymer and carbon black powder (average particle diameter: 80 nm) were dispersed at a solid content ratio of 9/1. The substrate was used as a working electrode with respect to a saturated calomel electrode, and a voltage was applied to make the electric potential of the working electrode being 2.6 V. The region, on which the colored electrodeposition films were not formed, was covered with a black thin film to form a black matrix.

After washing the substrate with water, a polyimide film having a thickness of 0.2 mm was put on the electrodeposition films of the substrate, and was passed between two rollers having a temperature of 140° C. and a nip pressure of 700 $g/cm^2$ at a linear speed of 20 mm/sec. The polyimide film was then peeled from the substrate, and it was found that the colored electrodeposition films were transferred onto the polyimide film. Thereafter, a protective layer was formed on the color filter layer constituted by the transferred colored electrodeposition films by coating a diluted solution of a polyimide resin, followed by drying, so as to produce a color filter. The color filter obtained had a high smoothness and a high light transmissibility and exhibited a high resolution.

EXAMPLE 4

An ITO conductive film having a thickness of 0.2 μm was formed on an aluminum substrate having a thickness of 5 mm by a sputtering method, and a silane gas was deposited on the ITO conductive film by a glow discharge deposition method, in which a diborane gas was introduced in the later half of the film formation period, to produce a p-type a-Si thin film having a thickness of 0.8 μm. The substrate was subjected to a heat treatment at about 500° C. for 1 hour to increase the crystallinity of the a-Si thin film, and then subjected to two kinds of doping treatment to make a pn junction polysilicon thin film.

The resulting substrate was arranged in such a manner that the polysilicon thin film came in contact with an electrodeposition solution, in which the styrene-acrylic acid random copolymer as in Example 1 and azo series magenta pigment super-fine particles were dispersed at a solid content ratio of 7/3. The electrodeposition solution had a maximum absorption wavelength of 553 nm and a volume resistivity of $3 \times 10^2$ Ω·cm. In the three-electrode arrangement that was generally used in the field of electrochemistry, the substrate was used as a working electrode with respect to a saturated calomel electrode, and a voltage was applied to the ITO conductive film to make the electric potential of the working electrode being 1.8 V. The polysilicon thin film was subjected to scanning exposure by using a He—Ne laser according to a signal corresponding to magenta pixels from the outside of the electrodeposition solution having a thickness of 0.5 mm. A magenta image pattern was formed on the light irradiated part of the surface of the polysilicon thin film.

The substrate having the magenta electrodeposition film was arranged in such a manner that the above-described polysilicon thin film came in contact with an electrodeposition solution (maximum absorption wavelength: 448 nm, volume resistivity $4 \times 10^2$ Ω·cm), in which the styrene-acrylic acid random copolymer and azo series yellow pigment super-fine particles were dispersed at a solid content ratio of 7/3. The substrate was used as a working electrode with respect to a saturated calomel electrode, and a voltage was applied to make the electric potential of the working electrode being 1.7 V. The polysilicon thin film was subjected to scanning exposure by using a He—Ne laser according to a signal corresponding to yellow pixels from the outside of the electrodeposition solution having a thickness of 0.5 mm. A yellow image pattern was formed on the light irradiated part of the surface of the polysilicon thin film.

The substrate having the electrodeposition films of two colors was arranged in such a manner that the polysilicon thin film came in contact with an electrodeposition solution (maximum absorption wavelength: 654 nm, volume resistivity $1.5\times10^2$ Ω·cm), in which the styrene-acrylic acid random copolymer and phthalocyanine series cyan pigment super-fine particles were dispersed at a solid content ratio of 7/3. The substrate was used as a working electrode with respect to a saturated calomel electrode, and a voltage was applied to make the electric potential of the working electrode being 1.7 V. The polysilicon thin film was subjected to scanning exposure by using a He—Ne laser according to a signal corresponding to cyan pixels from the outside of the electrodeposition solution having a thickness of 0.5 mm. A cyan image pattern was formed on the light irradiated part of the surface of the $TiO_2$ thin film. The volume resistivities of the electrodeposition films of three colors were $7\times10^6$ Ω·cm, $5\times10^7$ Ω·cm, and $3\times10^7$ Ω·cm, respectively.

After washing the substrate having the electrodeposition films of three colors with pure water, the substrate was arranged in such a manner that the polysilicon thin film came in contact with an electrodeposition solution, in which the above-described styrene-acrylic acid random copolymer and carbon black powder (average particle diameter: 80 nm). were dispersed at a solid content ratio of 5/5. The substrate was used as a working electrode with respect to a saturated calomel electrode, and a voltage was applied to make the electric potential of the working electrode being 2.5 V for 5 seconds. A black thin film was formed on the region, on which the colored electrodeposition films were not formed.

After washing the substrate with water, a white film having a thickness of 0.3 mm was put on the electrodeposition films and was passed between two rollers having a temperature of 170° C. and a nip pressure of 450 g/cm$^2$ at a linear speed of 12 mm/sec. The white film was then peeled from the substrate, and it was found that the colored electrodeposition films were transferred onto the white film. Thereafter, a protective layer was formed on the color filter layer constituted by the transferred colored electrodeposition films by coating a dilute solution of a polyimide resin, followed by hardening and drying. The image recorded on the white film had a resolution of 800 dpi and a gradation of 128 steps, and thus a color document having a high resolution and a high colorfulness could be produced.

According to the process for recording an image of the invention, a highly colorful image having high resolution and high gradation without restriction on the selection of a material used as a substrate. Since the electrodeposition film formed on the substrate is transferred to various image retaining members, it can be widely applied to a printing process and a production process of a color filter. In particular, when the invention is applied to the production of a color filter, a color filter of high resolution having a high smoothness and a high light transmissibility can be produced at low cost.

What is claimed is:

1. A process for recording an image comprising the steps of; arranging a substrate comprising a support, a conductive film and a photosemiconductor thin film laminated in this order, in such a manner that at least said photosemiconductor thin film comes in contact with an electrodeposition solution; and applying an electric current or a voltage to said conductive film, and simultaneously irradiating said substrate with light from the side of said photosemiconductor thin film through said electrodeposition solution, to generate a photoelectromotive force on a light irradiated part of said photosemiconductor thin film, so as to form an electrodeposition film on said light irradiated part.

2. The process for recording an image as claimed in claim 1, wherein a dominant wavelength range of said irradiation light differs from a dominant absorption wavelength range of said electrodeposition solution.

3. The process for recording an image as claimed in claim 1, wherein said substrate is irradiated with light from the side of said photosemiconductor thin film through said electrodeposition solution having an effective thickness from 20 $\mu$m to 15 mm.

4. The process for recording an image as claimed in of claim 1, wherein said electric current or said voltage is applied in such a manner that an absolute value of a difference in electric potential between a region of said photosemiconductor substrate, on which said electrodeposition film is formed, and a standard electrode is 5V or less.

5. The process for recording an image as claimed in claim 1, wherein said electrodeposition solution contains an ionic molecule, whose solubility changes corresponding to the change of pH, and said electrodeposition film contains said ionic molecule.

6. The process for recording an image as claimed in claim 5, wherein said ionic molecule is a random copolymer of a hydrophobic monomer and a hydrophilic monomer, and said random copolymer contains said hydrophobic monomer in an amount of from 40 to 80% by mol.

7. The process for recording an image as claimed in claim 5, wherein said ionic molecule is an ionic polymer having a number average molecular weight of from $6.0\times10^3$ to $2.5\times10^4$.

8. The process for recording an image as claimed in claim 5, wherein said ionic molecule has an acid value of from 70 to 195.

9. The process for recording an image as claimed in claim 1, wherein said photosemiconductor thin film comprises an n-type photosemiconductor, said electrodeposition solution contains an ionic molecule having a carboxyl group, and said electrodeposition film contains said ionic molecule.

10. The process for recording an image as claimed in claim 9, wherein said n-type photosemiconductor is an oxide semiconductor.

11. The process for recording an image as claimed in claim 9, wherein said n-type photosemiconductor is titanium oxide.

12. The process for recording an image as claimed in claim 1, wherein said photosemiconductor thin film comprises a p-type photosemiconductor, said electrodeposition solution contains an ionic molecule having an amino group or an imino group, and said electrodeposition film contains said ionic molecule.

13. The process for recording an image as claimed in claim 1, wherein said photosemiconductor thin film is a photosemiconductor thin film having a pn junction obtained by laminating an n-type photosemiconductor thin film and a p-type photosemiconductor thin film, or a photosemiconductor thin film having a pin junction obtained by laminating a p-type photosemiconductor thin film, an i-type photosemiconductor thin film and an n-type photosemiconductor thin film.

14. The process for recording an image comprising a step of forming at least one electrodeposition film having at least one color by said process for recording an image as claimed in claim 1; and then transferring said image on said substrate to an image retaining substrate.

15. A process for recording an image as claimed in of claim 14, wherein said transferring step is conducted while applying heat and/or pressure.

16. A process for recording an image comprising the step of; forming at least one electrodeposition film having at least one color by said process for recording an image as claimed in claim 1;

arranging said substrate having said electrodeposition film in such a manner that at least said photosemiconductor thin film comes in contact with an electrodeposition solution;

applying an electric current or a voltage to said conductive film, and simultaneously irradiating the whole surface of said substrate with light from the side of said photosemiconductor thin film through said electrodeposition solution, to generate a photoelectromotive force on the region having no electrodeposition film formed, so as to form an electrodeposition film on said region having no electrodeposition film formed; and transferring said electrodeposition film onto an image retaining substrate.

17. A process for producing a color filter comprising the steps of; forming red, green and blue electrodeposition films by said process for recording an image as claimed in claim 1;

arranging said substrate having said electrodeposition films in such a manner that at least said photosemiconductor thin film comes in contact with an electrodeposition solution;

applying an electric current or a voltage to said conductive film to form a black electrodeposition film on the region of said photosemiconductor thin film having no said electrodeposition films formed; and transferring said red, green and blue electrodeposition films onto a light-transmissible image retaining substrate.

18. A process for producing a color filter comprising the steps of; forming black, red, green and blue electrodeposition films by repeating four times said process for recording an image as claimed in any of claim 1; and transferring said black, red, green and blue electrodeposition films onto a light-transmissible image retaining substrate.

* * * * *